Patented Jan. 26, 1926.

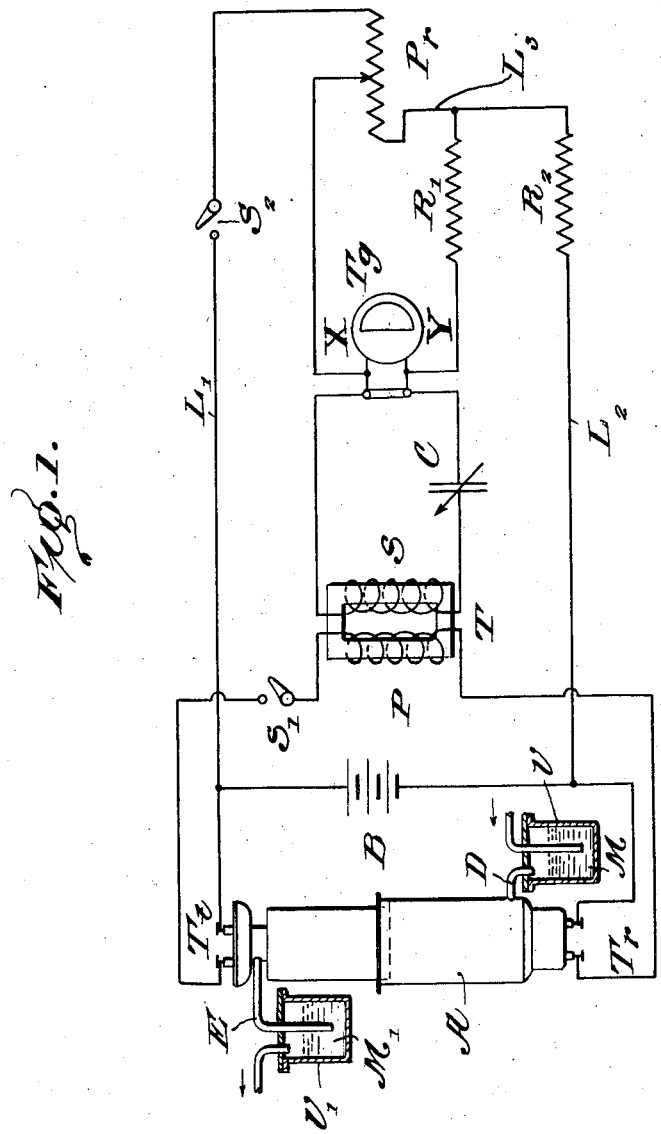

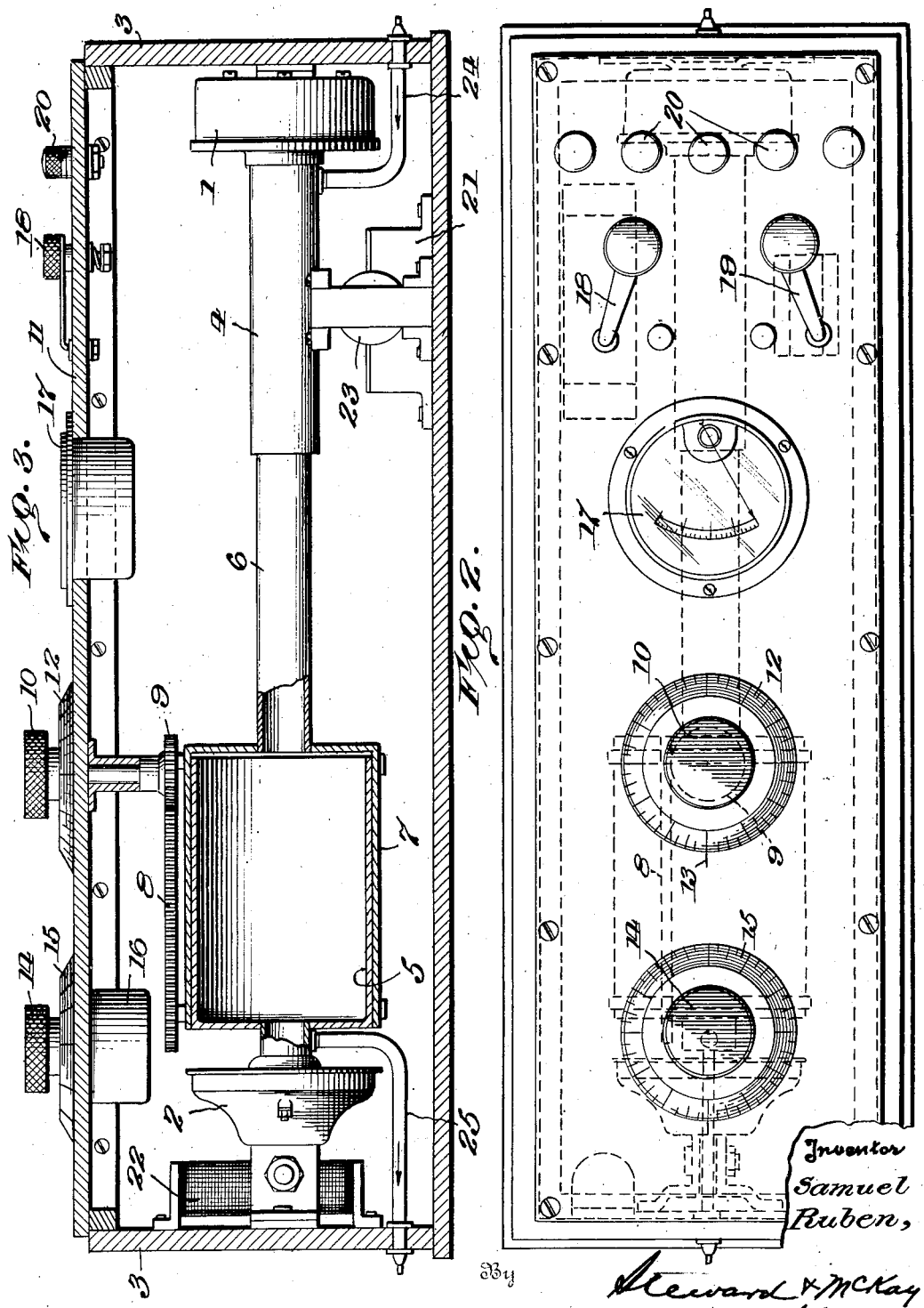

1,570,781

UNITED STATES PATENT OFFICE.

SAMUEL RUBEN, OF NEW YORK, N. Y.

TESTING APPARATUS AND METHOD.

Application filed December 20, 1921. Serial No. 523,713.

*To all whom it may concern:*

Be it known that I, SAMUEL RUBEN, a citizen of the United States, residing at New York, county of New York, State of New York, have invented certain new and useful Improvements in Testing Apparatus and Methods; and I do hereby declare the following to be a full, clear, and exact description of the invention, such as will enable others skilled in the art to which it appertains to make and use the same.

This invention relates to testing apparatus and methods; and it relates more particularly to methods of and apparatus for testing gaseous fluids for the purpose of ascertaining certain characteristics thereof. The characteristic to be determined may be physical, as where it is required, for example, to determine the velocity, density, or other physical property of the gaseous fluid; or it may be chemical, as where it is desired to determine the percentage of carbon dioxide or other constituent present in a gaseous mixture, although this chemical determination may be, and most desirably is, arrived at indirectly by determination of a physical characteristic such as density. At present, I regard the latter as the most important practical application of the invention. In explaining the underlying principles of the invention, therefore, reference will be made more particularly to a method and apparatus especially adapted for this purpose; but it is to be understood that the invention in its broader aspect is not restricted to this specific field.

The invention, broadly considered, makes use of the principle that mechanical energy impulses such as sound waves or vibrations, produced by a vibrating element or system of elements, differ in character depending upon the condition of the gaseous fluid medium in which such waves or vibrations originate or through which they are transmitted, all other conditions being assumed to remain the same. By "condition" of the gaseous fluid is here meant broadly either a physical property such as velocity, density or the like; or its chemical composition or constitution. If, therefore, provision is made for accurately indicating the effect produced by such waves or vibrations emitted in or transmitted through a known gaseous medium under predetermined standard conditions, and if those conditions are then altered only by the substitution of another gaseous fluid having a certain characteristic that is qualitatively known but quantitatively unknown, it is possible to obtain an indication, resulting from the effect of the substituted gaseous fluid, by which to make a quantitative determination of the particular characteristic to be investigated.

In its best practical embodiment the invention also makes use of the fact that where energy waves or vibrations emitted by a vibratory body are received by another body, a maximum effect is produced upon the receiving body when the latter is accurately in tune or resonance with the emitting body, and that a very slight deviation to either side of the point of sharp resonance or tuning has a very marked effect in reducing the effect produced.

In carrying out the invention practically and in the best form now known to me, use is made of a source of mechanical energy waves of audio-frequency, a resonator chamber, and a translating device of some suitable character that is responsive to sound energy, the sound source and the resonator chamber being relatively adjustable to give sharp tuning or resonance for production of a maximum effect upon the aforesaid responsive device. Thus, in a specific embodiment of apparatus within the scope of the invention, the source of audio-frequency impulses may be of constant frequency, and a resonator tube may be associated therewith and so adjusted that the gas column in the tube is initially in resonance with the said source, whereby a maximum sound intensity is obtained at the open end of the tube, that is, at the end remote from the sound source. Assuming the temperature and pressure to remain constant, a change in density of the gas in the resonator column disturbs the condition of resonance to a corresponding extent. Hence any variation in the composition of the gas column which produces a density change will accordingly affect the natural vibratory factors of the column and destroy perfect resonance or tuning. This alteration of condition necessarily alters the effect produced upon the responsive device employed in conjunction with the sound source and the resonator tube, and this altered effect may in turn be manifested through the agency of indicating means of any character suitable to permit observation and measurement of the change produced. It will be noted that the foregoing is predicated upon a change in the composition of the gas within the resonator tube; but in the broader aspects of the invention, this is not necessarily the determining factor. For example, instead of obtaining an indication by variation of the gas within the resonator tube, the character of the vibrations produced by the source may be altered directly at the source by bringing the gaseous fluid to be tested into such relation to said source that the character of the vibrations is thereby affected or determined before said vibrations are impressed upon the gas column in the resonator tube. Such a procedure is employed in a testing method and apparatus disclosed in my prior co-pending application Serial No. 460,829 filed April 12, 1921, of which the present application is in part a continuation. Certain of the broad claims hereto appended are therefore to be understood as based broadly upon and relating back to said earlier application, as will appear more fully hereinafter.

In order to afford a full understanding of the underlying principles of the invention, a specific embodiment thereof, applicable with especial advantage to the quantitative determination of a constituent, such as carbon dioxid, carbon monoxid, hydrogen or the like, present in a gaseous fluid, will now be described in detail for the sake of a concrete example. It will be seen that the method and apparatus hereinafter described differ fundamentally from methods and apparatus heretofore available for this purpose, especially in that such prior methods and apparatus are inherently limited to determination of gases that are either combustible or that have chemical affinity for some absorbing liquid or other reagent; whereas, on the contrary, no such limitation is imposed upon utilization of the present invention.

The novel apparatus here selected for the purpose of explaining and illustrating the broad principles of the invention in typical form is shown in the accompanying drawings, in which Figure 1 is a diagram illustrating the electrical circuit connections involved, and Figs. 2 and 3 are a top plan and central vertical longitudinal section, respectively, of one mechanical construction in which the essential elements of the apparatus may be embodied.

Referring first more particularly to the circuit diagram, Fig. 1, $T_r$ and $T_t$ are microphone devices constituting, respectively, the source of sound waves or vibrations and the sound responsive device upon which said vibrations or waves are impressed. In the present example, $T_r$ is an ordinary telephone receiver, while $T_t$ is a telephone transmitter, most desirably of a specially designed type having constant normal resistance properties and being capable of continuous operation. Such a microphone transmitter is well known in the art and requires no detailed description here. Between the said microphone devices is interposed the adjustable resonator chamber indicated generally at A, said chamber in this instance taking the form of a tube divided into two parts that telescope one upon the other and thus make possible the adjustment of the resonator chamber as a whole to different lengths. The adjustable resonator chamber is shown provided with a gas inlet at D and a gas outlet at E.

The sound source, that is, the telephone receiver, $T_r$, may be actuated at constant frequency by any means suitable for that purpose. In the particular arrangement here chosen to illustrate the principles of the invention, said receiver is coupled in an electric circuit with the microphone transmitter $T_t$, said circuit including a source of direct current such as battery B and also the primary P of the closed core transformer T. When the switch $S_1$ is closed, the circuit in which the two microphone devices and the battery are included is set into oscillation by the mutual reaction between the receiver and the transmitter, and these oscillations induce current in the circuit which includes the secondary S of the transformer T, which secondary circuit also includes the variable condenser C and a current measuring device $T_g$, which latter may desirably be a thermogalvanometer consisting of a thermo-couple with a galvanometer. This secondary circuit constitutes an oscillatory circuit which may be sharply tuned to resonance with the primary circuit frequency by means of the variable tuning element C.

Assuming that the telescopic resonator tube A has been adjusted in length to give a condition of mechanical resonance and therefore a maximum effect of the sound waves upon the microphone transmitter $T_t$, and further assuming that the secondary circuit aforesaid has been accurately tuned electrically to the primary circuit frequency, the meter $T_g$ indicates a maximum current due to the mechanical and electrical resonance condition obtaining in the system. If now a gas of density differing from that originally present in the resonator tube A be introduced thereinto, the gas column is thereby put out of resonance to an extent depending upon the change in the density of the gas in the tube; and since this produces a corresponding reduction of sound intensity at the transmitter $T_t$, the meter $T_g$ will indicate a correspondingly lower value of current. Assuming that the maximum current reading was observed for the original condition of resonance, the difference between that reading and the later reading gives a measure of the change in density of the gas in the resonator tube, and thereby affords means of determining the percentage of carbon dioxid or other gas present in the gas mixture which displaced that originally present in the resonator tube. It is of course assumed that the other conditions, such as temperature and pressure, were maintained constant throughout.

To increase the convenience of this method and apparatus, it is desirable to arrange the testing apparatus so that the current meter $T_g$ will give a direct indication of the difference in current flow, and hence a direct indication of the percentage of the gas constituent to be determined. To this end it is desirable to provide what may be termed a balancing circuit, said balancing circuit being connected in this instance to opposite sides of the battery B by leads $L_1$ and $L_2$. Lead $L_1$ is connected through switch $S_2$ and a variable potentiometer resistance $P_r$ to one side of the current meter, as indicated at X; while lead $L_2$ is connected through resistance $R_2$ and $R_1$ to the other side of the current meter as indicated at Y. There may also be a connection $L_3$ between leads $L_1$, $L_2$, in shunt across the meter terminals. The leads $L_1$, $L_2$, are connected to the current meter with such polarity as to oppose the reading due to the heating of the thermo-couple by the alternating current; and in the preliminary setting of the apparatus under resonant conditions throughout, the reading of the current meter can therefore be brought to zero by suitable adjustment of the variable potentiometer resistance. Any subsequent change in resonance will therefore produce a differential reading of the current meter, or a reading resulting from the ratio between the applied direct current from the potentiometer and the alternating current from the secondary of the transformer. The meter will give, reading directly from zero, the percentage of variation from resonance due to changes in resonance conditions of gas column and thus may be calibrated to indicate directly the percentage of the particular gas constituent sought.

In order to assist in maintaining constant pressure and temperature of the gas in the resonator tube A, the gas to be tested is passed through a suitable liquid seal before entering the resonator tube and also passes through a similar seal after it leaves the tube. For example, in the arrangement here shown, the inflowing gas passes through mercury M contained in a metallic vessel V, and thence by way of inlet D into the resonator tube. The outflowing gas passes from outlet E through mercury $M_1$ in metallic vessel $V_1$. It is to be understood that the gas may be passed through the resonator tube continuously during the test; and in fact where the system is to be used as a continuous indicator of the percentage of carbon dioxid, for example, present in an industrial gas such as flue gas, the gas to be tested will normally pass continuously through the resonator tube. If desired, suitable recording mechanism may also be provided for making a continuous record of the indications given by the meter $T_g$, but as such recording mechanism is well known in the art it is unnecessary to describe the same in detail here.

Apparatus embodying the essential features of the system above described may be constructed and assembled in various mechanical forms, but that illustrated in Figs. 2 and 3 has proved satisfactory and efficient in actual practice. In the construction illustrated in Figs. 2 and 3, 1 and 2 are a telephone receiver and a telephone transmitter respectively, stationarily supported upon the opposite end walls of a suitable box or casing 3. The telephone receiver 1 has a stationary tubular extension 4 projecting horizontally toward the middle of the casing; while the transmitter 2 is provided with a stationary tubular extension 5 of much larger diameter, also projecting toward the middle of the casing said extensions 4 and 5 being arranged coaxially with respect to each other and with respect to the aforesaid microphone devices. Interposed between and telescopically engaging both said tubular extensions is a longitudinally movable tubular member having a portion 6 suitably dimensioned to slide within the extension 4, a portion 7 of much larger diameter sliding upon the extension 5. The smaller portion 6 of the intermediate movable tubular member serves principally as guide means in cooperation with the stationary tubular extension 4 which serves as a support therefor, the main portion of the gas column being contained in the chamber provided by the telescoping members 5 and 7. By sliding the intermediate movable member to the right, this chamber can be enlarged as is evident from inspection of the drawing. Any suitable means may be provided for effecting this adjustment, that shown in the drawings being convenient and comprising the rack and pinion mechanism 8, 9, controlled by a knob 10 extending outside of the casing cover 11. The knob 10 may carry an indicator dial revoluble therewith and having graduations cooperating with a fixed mark 13 on the cover, to determine the exact relative position of the telescoping parts. A similar knob 14 and dial 15 may be provided for adjustment of the variable potentiometer resistance which may be housed in casing 16. At 17 is the current meter, in this instance a thermo-galvanometer. At 18 and 19 are switches corresponding to the switches $S_1$, $S_2$ in Fig. 1; and at 20 are shown binding posts for making the various circuit connections required, the circuit connections themselves being omitted from Figs. 2 and 3 to avoid confusion. At 21 and 22 may be located resistances corresponding to $R_1$ and $R_2$ of the circuit diagram, Fig. 1; and the transformer may be located at 23.

Inlet tube 24 is provided for introduction of gas into the adjustable tubular chamber or gas column, and outlet tube 25 is provided for the exit of such gas from the apparatus. The outer ends of both tubes 24 and 25 are formed to facilitate attachment of rubber tubing or the like to provide the necessary connections leading to the mercury seals previously referred to in describing Fig. 1.

In use, the apparatus is first calibrated by using air in the adjustable gas column. With the primary circuit switch closed, the knob 10 is turned in one direction or the other until a condition of apparent maximum resonance is obtained as indicated by the reading of the current meter in the secondary circuit. The secondary circuit should be accurately tuned electrically to the frequency of the primary circuit by adjusting the variable condenser until the maximum current reading is obtained. Some slight further adjustment of the gas column may then be found necessary to attain the desired condition of perfect sound resonance simultaneously with perfect electrical resonance of the primary and secondary circuits. This condition having been eventually attained by adjusting the apparatus in the manner described, the switch $S_2$ (19) in the balancing circuit is then closed, and the potentiometer resistance is adjusted until the meter reading is zero. The gas to be tested, say a flue gas of which it is desired to determine the carbon dioxid content, is then passed through the mercury seal and inlet tube 24 into and through the adjustable gas chamber, leaving the same through outlet tube 25 and the second mercury seal. The density of the gas in the gas column is now greater than when it consisted of air, and accordingly the column is thrown out of resonance proportionately, and the current meter shows a differential reading that represents a determinable relation between the reduced secondary current and the opposing current of the balancing circuit. If the apparatus has been previously calibrated for determination of carbon dioxid, this reading may be directly in percentage of this gas; and where the apparatus is to be used continuously with flue gas passing through the adjustable gas chamber at all times, suitable recording means may be provided, as already pointed out, for production of a permanent record of the meter readings.

It will be seen that the operation of the particular apparatus hereinabove described depends upon change in density of the gas within the adjustable gas column itself. In my prior application Ser. No. 460,829, hereinabove referred to, which is directed more particularly to a flow meter for measuring the rate of flow of gases and vapors in conduits, but which involves some of the same broad principles here in question as before stated, the gas to be tested is not introduced into the adjustable resonator tube but is caused to operate a whistle or other sound producing device whereby sound vibrations of an intensity dependent upon the gas velocity are impressed upon said gas column through the agency of a vibration diaphragm actuated by said whistle. The sound waves or vibrations thus impressed upon the resonant gas column in the apparatus of my prior application aforesaid act upon a telephone transmitter, as in the case of the present apparatus; and the variations in intensity of said sound waves produce resultant variations in flow of current in a circuit in which said transmitter is included, all in a manner analogous to the operation of the apparatus of the present application. It is therefore to be understood that some of the broader claims hereto appended include within their scope apparatus of the type disclosed in my prior application aforesaid.

What I claim is:

1. Apparatus of the character described comprising, in combination, a source of mechanical energy impulses, a device responsive to such impulses, indicating means actuated by said device, and means enclosing a gas column arranged to transmit impulses from said source, said source and gas column being relatively adjustable for resonance, and provision being made for changing the condition or nature of the gas in said column.

2. Apparatus for testing gaseous fluid comprising, in combination, a source of sound waves, a resonator chamber of adjustable capacity adapted and arranged to transmit said waves and provided with a gas inlet and a gas outlet, and electrical means arranged to indicate a characteristic of sound waves transmitted thereto through said resonator chamber.

3. Apparatus for testing gaseous fluid comprising in combination, a microphone device such as a telephone receiver serving as a source of sound waves, an adjustable resonator chamber adapted and arranged to receive and transmit sound waves emitted thereby, said chamber having provision for passing a gaseous fluid therethrough, a second microphone device such as a telephone transmitter adapted and arranged to be actuated by such transmitted waves, a circuit including said second microphone device and also a source of current supply, an oscillatory circuit energized by the first mentioned circuit, and indicating means controlled by flow of current in said oscillatory circuit.

4. Apparatus as set forth in claim 3, further characterized by the provision of a balancing circuit that causes said indicating means to give a differential reading.

5. Apparatus as set forth in claim 3 in which said oscillatory circuit includes adjustable tuning means.

6. Apparatus as set forth in claim 4 in which said oscillatory circuit includes adjustable tuning means.

7. Apparatus as set forth in claim 2 further characterized by the provision of means for maintaining predetermined pressure within said resonator chamber.

8. Apparatus for testing gaseous fluid comprising, in combination, a resonance chamber provided with a gas inlet and a gas outlet, means for impressing upon a column of gaseous fluid contained therein mechanical wave impulses of substantially constant frequency, an impulse-responsive device arranged to receive and to be actuated by the impulses transmitted by said column of gaseous fluid, electrical circuit means in which such responsive device is included, and indicating means arranged to indicate change of current flow in said circuit means produced by actuation of said device.

9. Apparatus as set forth in claim 8 further characterized by provision of means for maintaining substantially constant pressure conditions in said chamber.

10. Apparatus for testing gaseous fluid comprising, in combination, two stationarily mounted microphone devices, a stationary tubular member connected to one of said microphone devices, a stationary tubular member of larger diameter than the first connected to the other of said microphone devices, an interposed tubular member telescopically engaging both the said stationary tubular members, and means for moving said interposed tubular member lengthwise in opposite directions.

11. Apparatus as set forth in claim 10 wherein each of the stationary tubular members is provided with a gas connection.

12. Apparatus as set forth in claim 10 wherein rack and pinion mechanism is provided for moving said interposed tubular member.

13. The method of testing a gaseous fluid which comprises influencing by means of the fluid to be tested the character of sound waves produced by a vibratory system, and utilizing such sound waves to produce an indication by which a characteristic of said fluid can be determined.

14. The method of testing a gaseous fluid which comprises utilizing such fluid as a medium for propagation of sound waves, utilizing the energy of such sound waves to actuate a microphone device arranged to affect an electric circuit, and measuring the current in said circuit.

15. The method of testing a gaseous fluid which comprises employing such fluid as a medium for transmission of sound waves from a source of sound energy to indicating means, and comparing the resultant indication with that obtained when a standard gaseous fluid is employed as the transmission medium under the same conditions.

16. The method of testing a gaseous fluid which comprises impressing upon a column of said fluid vibratory impulses of substantially constant frequency, and measuring the intensity of the resultant impulses transmitted by said column of gaseous fluid.

17. The method of testing a gaseous fluid which comprises impressing upon a column of said fluid sound waves of predetermined frequency, subjecting to the resultant vibrations of such column a sound-responsive device included in an electric circuit and operable to vary flow of current therein, and measuring the current in said circuit.

18. The method of testing a gaseous fluid which comprises impressing upon said fluid in a resonance column system sound waves of substantially constant frequency, and utilizing the resultant impulses transmitted by said fluid to affect a sound-responsive device included in an electric circuit and capable of varying the current flow therein, and observing the effect thereby produced upon such current flow.

19. The method of testing a gaseous fluid which comprises establishing and maintaining a substantially continuous flow of such gaseous fluid through a suitable chamber under substantially constant conditions of pressure and temperature, impressing vibratory impulses of substantially constant frequency upon the gaseous fluid in said chamber, and observing the intensity of the impulses transmitted by said gaseous fluid.

20. The method of testing a gaseous fluid which comprises establishing and maintaining a substantially continuous flow of such gaseous fluid through a suitable chamber under substantially constant conditions of pressure and temperature, impressing vibratory impulses of substantially constant frequency upon the gaseous fluid in said chamber, and utilizing the impulses transmitted by said gaseous fluid to actuate a device responsive thereto and thereby to produce indications of current changes in an electrical circuit including said device.

21. The method of testing a gaseous fluid which comprises impressing upon an adjustable column of gaseous fluid used as a standard of comparison mechanical wave impulses of predetermined frequency, utilizing the impulses transmitted by said column of gaseous fluid to actuate a responsive device included in an associated electrical circuit system, adjusting such gaseous column to obtain an observable standard condition in said electrical circuit system, replacing the gaseous fluid in said column with the gaseous fluid to be tested, and observing resultant change from said standard condition in said circuit system.

22. The method of testing a gaseous fluid to determine a characteristic thereof which comprises impressing upon a column of such gaseous fluid impulses derived from a source vibrating at substantially constant frequency, and comparing the character of the impulses so impressed with that of the impulses impressed by said source under equivalent conditions upon a similar column of gaseous fluid of known characteristics.

23. The method of testing a gaseous fluid to determine a characteristic thereof which comprises impressing upon a column of such gaseous fluid impulses derived from a source maintained in vibration at a substantially constant frequency, and comparing the intensity of the impulses so impressed with that of the impulses impressed by said source under equivalent conditions upon a similar column of gaseous fluid of known characteristics.

24. The method of testing a gaseous fluid to determine a characteristic thereof which comprises impressing upon a column of gaseous fluid of known characteristics impulses derived from a source maintained in vibration at a substantially constant frequency, under conditions such that said column is in resonance with said source, similarly impressing impulses from said source under the same conditions upon a column of the gaseous fluid of which said characteristic is to be determined, and utilizing the departure in the latter case from the condition of resonance first obtained as a measure to determine the characteristic in question.

25. The method of determining the proportion of a given component of a gaseous mixture which comprises establishing a condition of resonance between a source of substantially constant frequency vibrations and a column of a standard gaseous fluid differing from the mixture to be examined substantially only as regards the proportion in which said component is present, substituting for said standard gaseous fluid the gaseous mixture to be examined, and utilizing the resultant departure from the aforesaid conditions of resonance as a measure of the component to be determined.

In testimony whereof I hereunto affix my signature.

SAMUEL RUBEN.